United States Patent
Bosbach et al.

(10) Patent No.: US 8,678,778 B2
(45) Date of Patent: Mar. 25, 2014

(54) FLOW-DUCTING UNIT WITH PUMP AND FITTING

(75) Inventors: Franz Bosbach, Freinsheim (DE); Daniel Huying, Frankenthal (DE)

(73) Assignee: KSB Aktiengesellschaft, Frankenthal (DE)

( * ) Notice: Subject to any disclaimer, the term of this patent is extended or adjusted under 35 U.S.C. 154(b) by 109 days.

(21) Appl. No.: 13/188,106

(22) Filed: Jul. 21, 2011

(65) Prior Publication Data

US 2011/0303297 A1    Dec. 15, 2011

(51) Int. Cl.
*F04B 41/00* (2006.01)
*F04B 49/22* (2006.01)

(52) U.S. Cl.
USPC ............. 417/236; 417/423.1; 137/565.11; 137/565.12

(58) Field of Classification Search
USPC ............. 417/236, 423.1; 137/565.11, 565.12, 137/565.13, 565.16
See application file for complete search history.

(56) References Cited

U.S. PATENT DOCUMENTS 3,817,284 A * 6/1974 Daugherty ............... 137/614.13
5,038,817 A * 8/1991 Henry et al. ............. 137/315.29
5,713,729 A * 2/1998 Hong ....................... 417/423.14
6,619,935 B1 * 9/2003 Kluth et al. ............... 417/423.1
7,114,207 B2 * 10/2006 Wang ......................... 5/713

FOREIGN PATENT DOCUMENTS

DE         1 912 655 A1    12/1970
WO     WO 01/07836 A1      2/2001
WO     WO 2009/070565 A1   6/2009

* cited by examiner

*Primary Examiner* — Charles Freay
(74) *Attorney, Agent, or Firm* — Crowell & Moring LLP

(57) ABSTRACT

A flow-ducting system with a combined pump-drive module, the pump-drive module including a drive module, and a pump module having an impeller that can be driven by the drive module, the unit including a casing having at least one inlet side and at least one outlet side and a moveable shut-off device arranged between them, a flow path between the inlet side and the outlet side being formed in at least one position of the shut-off device, and the pump module being arranged in the flow path between the inlet side and the outlet side. In at least one further position of the shut-off device (10, 10'), the unit (1) is capable of shutting off the flow path (9) in such a way that the shut-off device (10, 10') and the unit casing (2) form an area (20), which is separated from the flow path (9) and which is sealed off from the inlet side (5) and the outlet side (6), and the pump-drive module (11, 11') is arranged at least partially inside this area (20).

17 Claims, 11 Drawing Sheets

FLOW-DUCTING UNIT WITH PUMP AND FITTING

BACKGROUND OF THE INVENTION

The invention relates to a unit for a flow-ducting system with a combined pump-drive module, the pump-drive module comprising a drive module, and a pump module having an impeller that can be driven by said drive module, the unit comprising a casing having at least one inlet side and at least one outlet side and a moveable shut-off device arranged between them, a flow path between the inlet side and the outlet side being formed in at least one position of the shut-off device, and the pump module being arranged in the flow path between the inlet side and the outlet side.

PCT patent publication no. WO 2009/070565 discloses a unit of the foregoing general type. A flow-ducting unit constructed as pump comprises a casing having at least one inlet and at least one outlet. An impeller for delivering a fluid is driven by a motor. A rotatable valve is arranged between the impeller and the outlet side of the pump and has an aperture. The valve serves, by means of the rotatably positioned aperture, to channel a fluid flow into various outlets or outlet ducts. The flow-ducting unit of WO 2009/070565 has an elaborate construction and has the further disadvantage that the flow path has to be separated when servicing the pump. Such a construction therefore cannot be used for many applications, for example in chemical engineering.

U.S. Pat. No. 6,619,935 (=WO 01/07836) discloses a mixing valve having a casing with inlets and outlets on the casing, and controlling the connection between the inlets and outlets a control element, which is embodied as a rotating pump impeller, which through axial displacement controls the connection between the inlets and outlets lying in different planes. The pump impeller is driven by a motor via a hollow shaft. In this mixing valve with integral pump various flow paths can be achieved as a function of the axially displaceable control element. In this construction, used especially for mixing valves in closed heating circuits, the pump impeller is an integral part of the control element. When servicing, the entire arrangement has to be removed, giving rise to the disadvantages described above.

German patent application publication no. DE 1 912 655 A discloses a three-way mixing valve combined with a pump. In a valve casing, dividing walls separate three chambers, of which a middle chamber is embodied as pump chamber having a valve outlet, and the other two chambers are each connected to a valve inlet. A hollow cylindrical centrifugal pump body, coupled to a drive motor and rotatably supported in the dividing walls, is arranged in the middle chamber. This body is connected to the other two chambers and the passage cross section of its admission apertures can be regulated by two externally actuated valve bodies seated on a common valve stem. Any adjustment of the valve stem between two limit positions of the valve bodies is catered for. The pump module here always remains connected to the valve outlet.

SUMMARY OF THE INVENTION

The object of the invention is to provide a flow-ducting unit of the aforedescribed general type, which has a less elaborate construction.

Another object of the invention is to provide a flow-ducting unit which is easy to service.

These and other objects are achieved in accordance with the invention by providing a flow-ducting unit which, in at least one further position of the shut-off device, is capable of shutting off the flow path in such a way that the shut-off device and the unit casing form an area, which is separated from the flow path and which is sealed off from the inlet side and the outlet side, the pump-drive module being arranged or capable of arrangement inside this area. In the further position of the shut-off device an area separated from the flow path is formed by the shut-off device, the unit casing and possibly the pump module. The shut-off device closes this area, sealing it off completely from the inlet and outlet of the flow path. The pump-drive module is arranged partially or entirely inside this sealed-off area. In particular the pump module is arranged entirely inside the separated area. Consequently the pump-drive module can be serviced without the existence of a connection for the fluid delivered. No additional precautions for diverting the flow or sealing measures need to be taken. A unit is created, which in its performance in the shut-off state, can be used in just the same way as a conventional flow-ducting shut-off unit without a pump module. The sealing tightness can be rapidly and securely established. In the non-shut-off state the pump module is arranged directly in the flow path and fulfils its delivery and/or pressure-boosting function.

In accordance with one preferred embodiment of the invention, the pump-drive module is arranged or fitted at least partially in the shut-off device. Such an integration of the pump-drive module into the shut-off device saves installation space. At the same time the pump-drive module is not only fitted entirely or partially into the shut-off device but is also embedded as an integral component into the shut-off device.

In accordance with another embodiment of the invention, the shut-off device has a multi-part construction comprising mutually spaced shut-off device elements and the pump-drive module is arranged, capable of arrangement or fitted between the shut-off device elements.

The impeller is advantageously an axial or semi-axial centrifugal pump impeller. Such an impeller is particularly suitable for in-line arrangements of the inlet side and outlet side, that is to say for arrangements in which the position of the inlet side and outlet side of the unit according to the invention allow installation in a pipeline running in a straight line. Alternatively a radial centrifugal pump impeller is provided, which on the pressure side may additionally comprise a flow-deflecting baffle device.

Ideally the impeller of the pump module has an entirely shaft-less design, that is to say it is constructed without a central shaft. The impeller vanes forming the impeller may project into the flow path from outside. At the same time they may be arranged spaced at an interval from one another in a central area of the flow path, so that a vane-less flow passage is formed. Alternatively the impeller vanes may be designed to touch one another, making the impeller more stable.

The pump-drive module suitably comprises an impeller arranged in a rotor embodied as a ring, and a stator embodied as a ring completely enclosing the rotor. A hollow, annular rotor is therefore enclosed by a hollow annular stator. The impeller vanes are suitably fastened to an inner face of the rotor. It is advantageous if the rotor is a synchronous rotor excited by permanent-magnets. The rotor ring here forms the carrier for the impeller vanes projecting into the flow path. It is furthermore advantageous if the rotor is formed as an integral part of the pump module.

Advantageous flow conditions are afforded by an embodiment in which the shut-off device comprises a flow passage having a flow cross section, which corresponds to the clear flow cross section of the pump module, that is to say the flow cross section allowing for the impeller vanes of the pump module. For this purpose the shut-off device may be of conical design. In particular the shut-off device comprises a flow passage, the diameter of which towards the pump module widens out conically to the inside diameter of the flow passage of the pump module. The shut-off device likewise has a flow passage, the diameter of which corresponds to the inside diameter of the pump module, particularly the inside diameter of the rotor ring.

In accordance with a further advantageous embodiment of the invention, the pump-drive module is constructed so as to be removable from the unit or capable of insertion into the unit when the flow path is shut off. The pump-drive module may be designed for insertion into the shut-off device. For this purpose the pump-drive module may be equipped with guide means, which are guided in corresponding mounts of the shut-off device.

A variant embodiment that is advantageous in terms of the material outlay is obtained if the pump module and/or the drive module is of lamellar construction and/or is matched to the dimensions of the shut-off device. In this case one end of the pump-drive module may have a curved contour, particularly a circular arc-shaped contour.

According to the invention a pipeline is provided as a unit defining a flow path. A unit embodied as a fitting is particularly advantageous. Here the shut-off device of the fitting is advantageously embodied as a ball cock. A ball cock can be brought into a position shutting off the flow path by turning through 90 degrees, for example. Turning the ball cock through approximately 180 degrees reverses the direction of delivery of the pump module. The unit according to the invention thus allows a delivery in the opposite direction of flow without any efficiency losses. The pump-drive module is ideally arranged entirely in the ball cock. The impeller arranged in the pump module may be of axial, semi-axial or radial type. A shape of the pump-drive module matched to the shut-off device and the pump module may advantageously assume that of a cylinder having a semi-spherical end, which can be inserted into the ball of the ball cock.

The shut-off device is alternatively embodied as a slide. This is advantageously designed for insertion into the unit. In this case the pump-drive module is suitably arranged in the slide. The slide here ideally comprises an upper area, which serves for shutting off the flow path, and a lower area, which accommodates the pump module. The shut-off part or the pump module is situated in the flow path, depending on how such a slide is positioned inside the flow-ducting unit. According to a further variant of the invention, the pump-drive module has an externally accessible casing chamber when the flow path is shut off.

Further fittings such as flaps, valves, backflow preventers or the like also fall within the scope of the invention.

According to the invention the unit comprises a multi-part, in particular a two-part casing with the casing parts at least partially enclosing the shut-off device and the pump-drive module. A two-part casing suitably comprises casing halves formed from two half-shells.

The shut-off device of the unit also comprises an additional clear passage. The unit can thereby be switched between three positions. In addition to the shut-off state and the state with the pump in the flow path, the state with a completely clear passage is thereby also provided. Here the arrangement is designed so that with the pump-drive module removed the unit can be switched between a shut-off flow path and a completely clear flow path. Locking means are suitably provided, which prevent the unit being accidentally switched into a wrong position when the pump-drive module is removed. According to the invention the shut-off device also continuously opens a passage cross section of the flow path in the manner of a valve body.

If desired, multiple, possibly different units according to the invention may be combined with one another in order to construct a flow-ducting system. For this purpose the units according to the invention are constructed for connection to one another.

The construction of the shut-off device according to the invention with the integral pump affords new fluid handling control strategies. In such a strategy a regulating device regulates and/or controls the position of the shut-off device and the operating behavior of the pump-drive module. A rapid and efficient closure of the fitting combined with a smooth adjustment of the fluid flow by the pump affords advantages in sensitive processes.

BRIEF DESCRIPTION OF THE DRAWINGS

The invention will be described in further detail hereinafter with reference to illustrative embodiments depicted in the accompanying drawing figures, in which.

DETAILED DESCRIPTION OF PREFERRED EMBODIMENTS

Figure 1A:
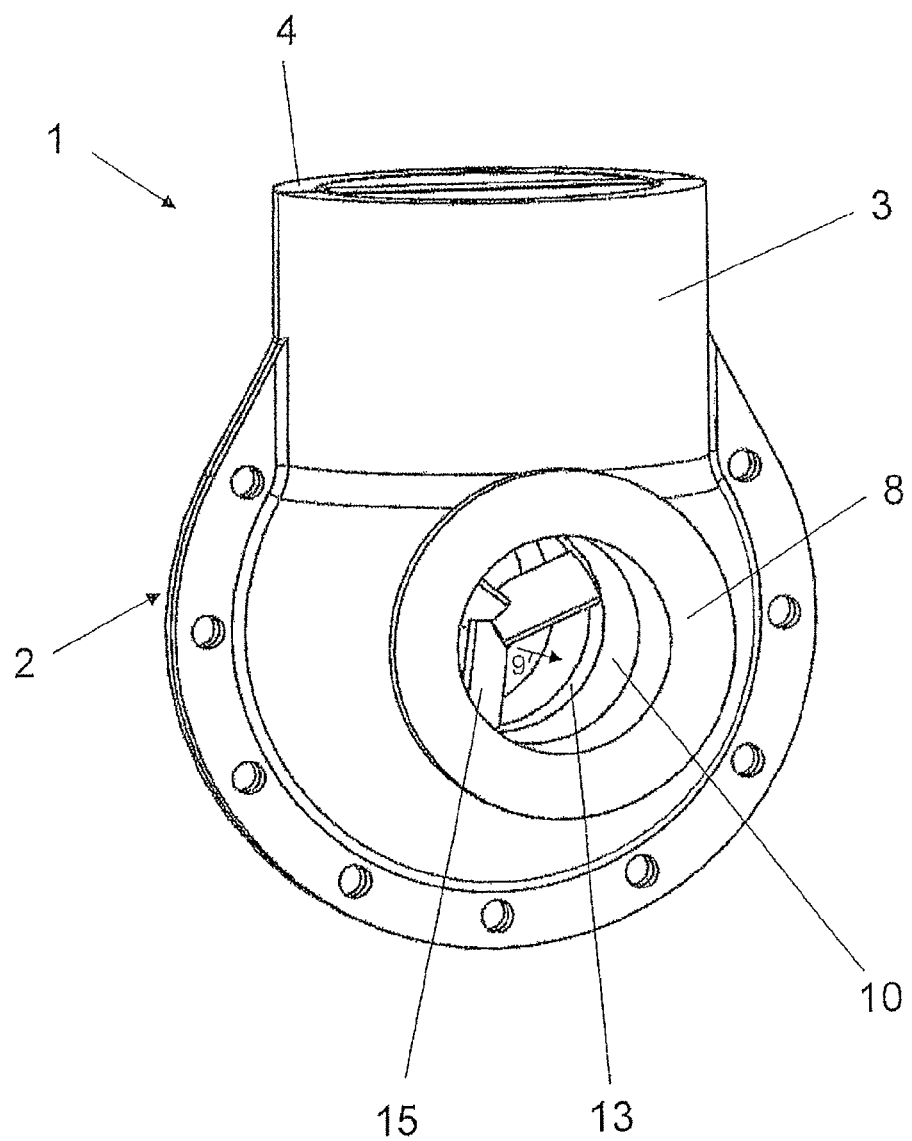
FIGS. 1a and 1b show a unit according to the invention having a ball cock with opened flow path.
Figure 1B:
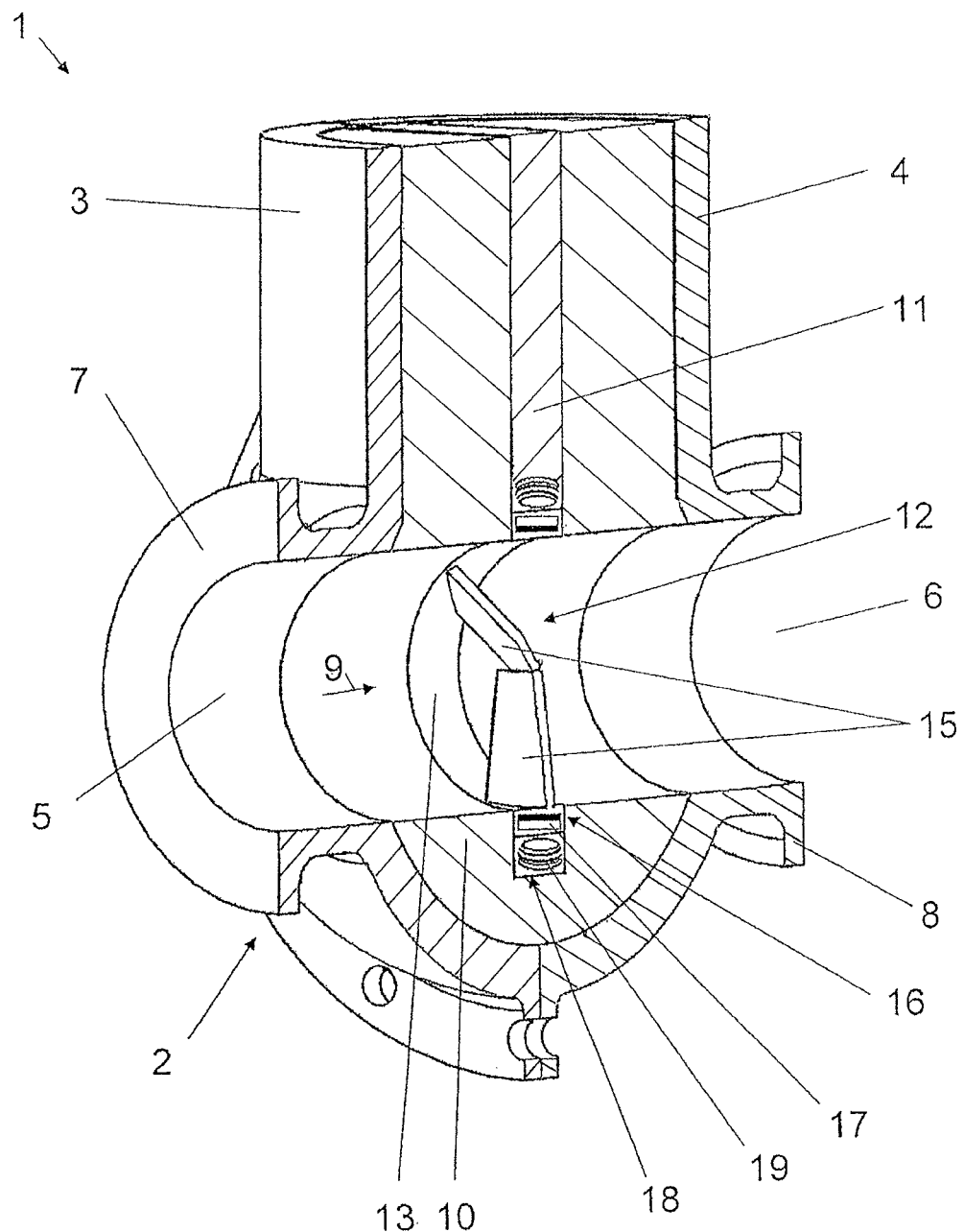

FIG. 1a shows a perspective view of a flow path-defining unit 1 according to the invention for a flow-ducting system. FIG. 1b shows a section through the same unit 1. The unit 1 comprises a casing 2 having casing halves 3, 4. The unit 1 has an inlet side 5 and an outlet side 6. The unit 1 comprises a flange 7 on the inlet side and a flange 8 on the outlet side. A shut-off device 10 in the form of a ball cock is arranged inside the unit casing 2. The shut-off device 10 is rotatably arranged in the unit casing 2. Manually or powered by a drive, the shut-off device 10 can be rotated into various positions by means of an actuating or positioning means (not shown). For reasons of clarity an optional monitoring, regulating and/or control device, its power supply and a power supply of the pump-drive module 11 are also not represented. In the opened state shown the unit 1 opens a flow path 9 between the inlet side 5 and the outlet side 6 identified by an arrow. According to the invention the unit 1 comprises a combined pump-drive module 11, the pump-drive module 11 being arranged in an area, which in another position of the shut-off device 10 can be separated from the flow path 9 and which is sealed off from the inlet side 5 and the outlet side 6. A pump module 12 is integrally connected to an annular rotor 16 having permanent magnets 17. The rotor 16 interacts with an annular stator 18 having a stator winding 19. Impeller vanes 15 are arranged on an inner face 13 of the rotor 16. The impeller vanes 15 form a centrifugal pump impeller of axial type. In the state shown with the fitting opened the pump module 12 is arranged in the flow path 9 between the inlet side 5 and the outlet side 6. The impeller is of shaft-less design, the impeller vanes 15 touching one another in a central area, thereby making the arrangement more stable.

Figure 2A:
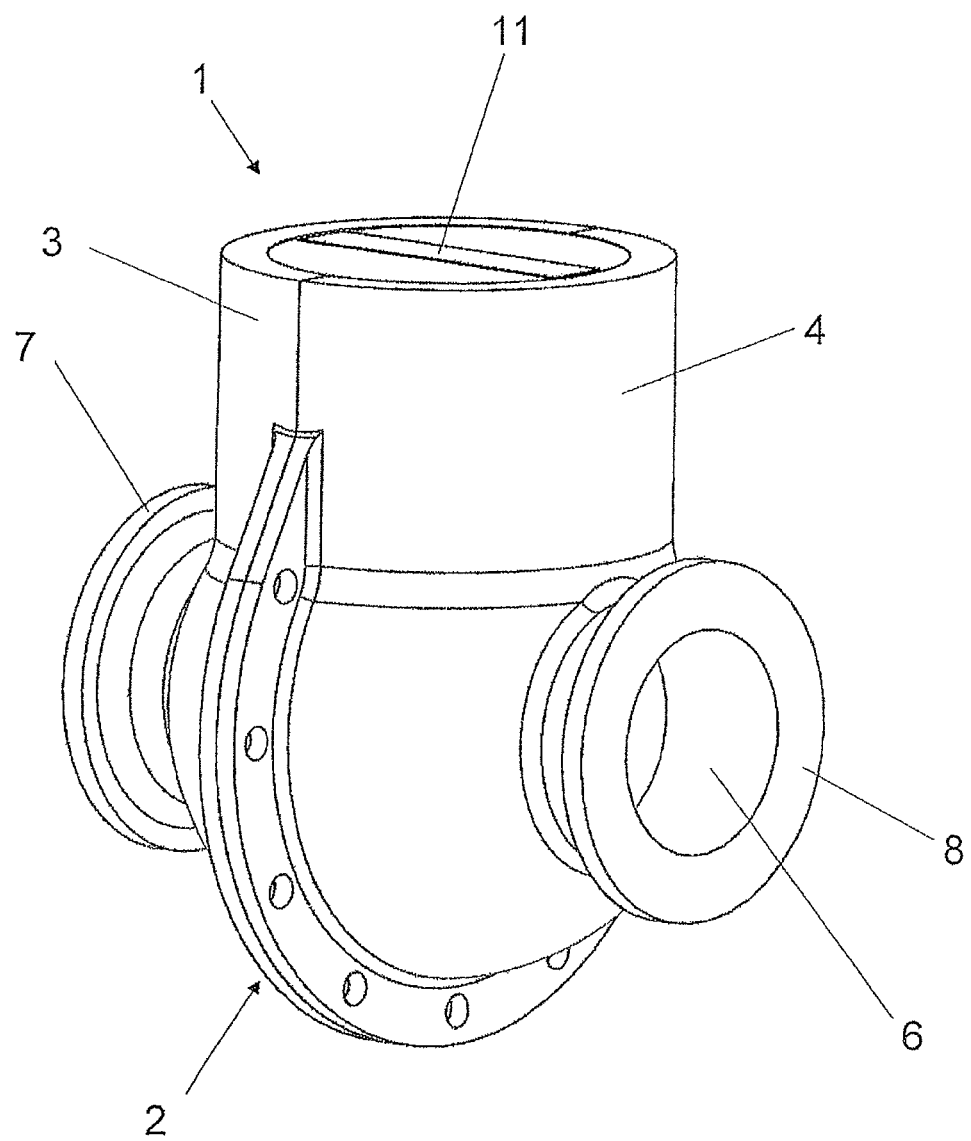
FIGS. 2a and 2b show the unit of FIG. 1 with the flow path shut off.
Figure 2B:
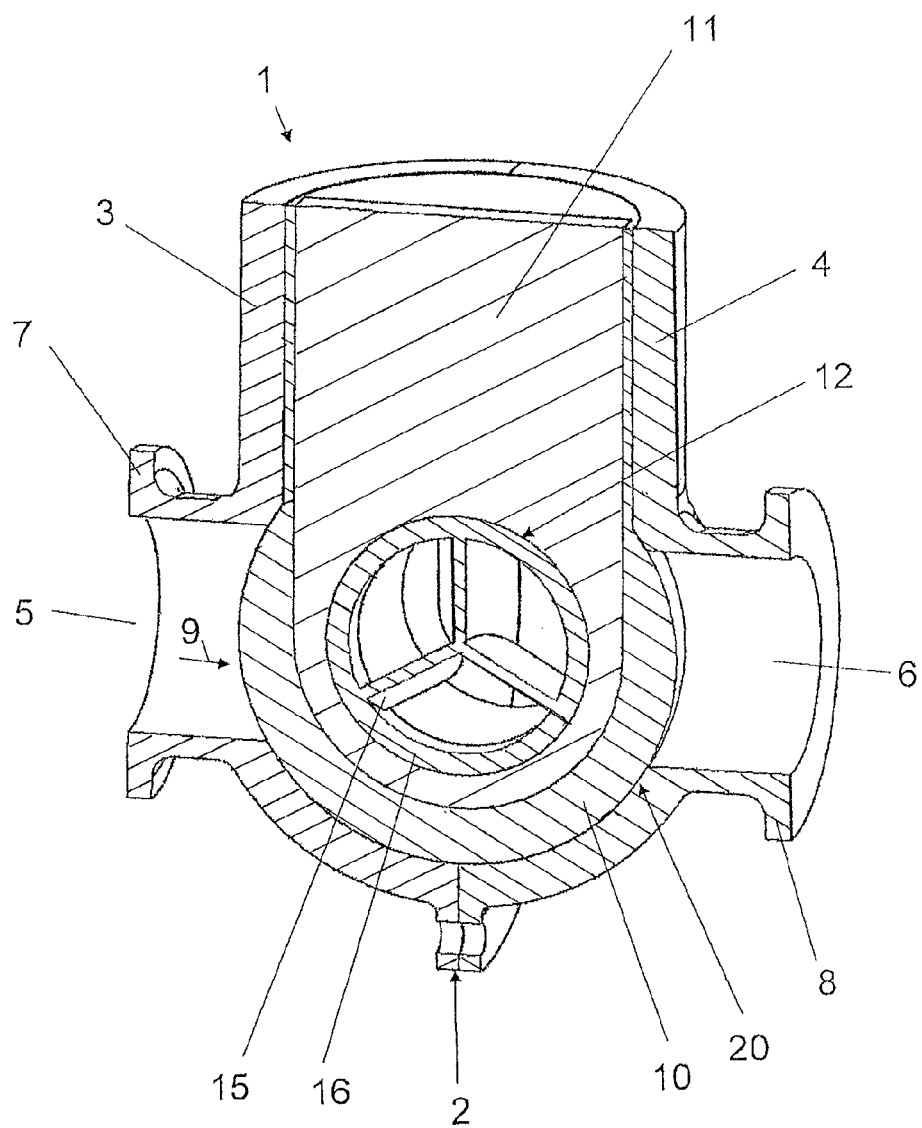

FIG. 2a shows a perspective view of the same unit 1 in a closed state. FIG. 2b shows a section through the unit. The shut-off device 10 in the form of a ball cock is turned by approximately 90 degrees compared to FIGS. 1a, 1b. In this further position the unit 1 shuts off the flow path 9 in such a way that an area 20 separated from the flow path 9 is formed by the shut-off device 10 and the unit casing 2. This area 20 is sealed off both from the inlet side 5 and from the outlet side 6. In this position of the shut-off device 10 no connection of any kind exists from the inlet side 5 or the outlet side 6 to the pump-drive module 11, which is thereby separated from the pumped fluid. The pump-drive module 11 is arranged entirely in the shut-off device 10. In addition the pump-drive module 11 is designed for removal from and insertion into the shut-off device 10. When servicing, the pump-drive module 11 can thereby easily be removed from the shut-off device 10 and serviced. No additional precautions to divert the flow or additional sealing measures need to be taken.

Figure 3:
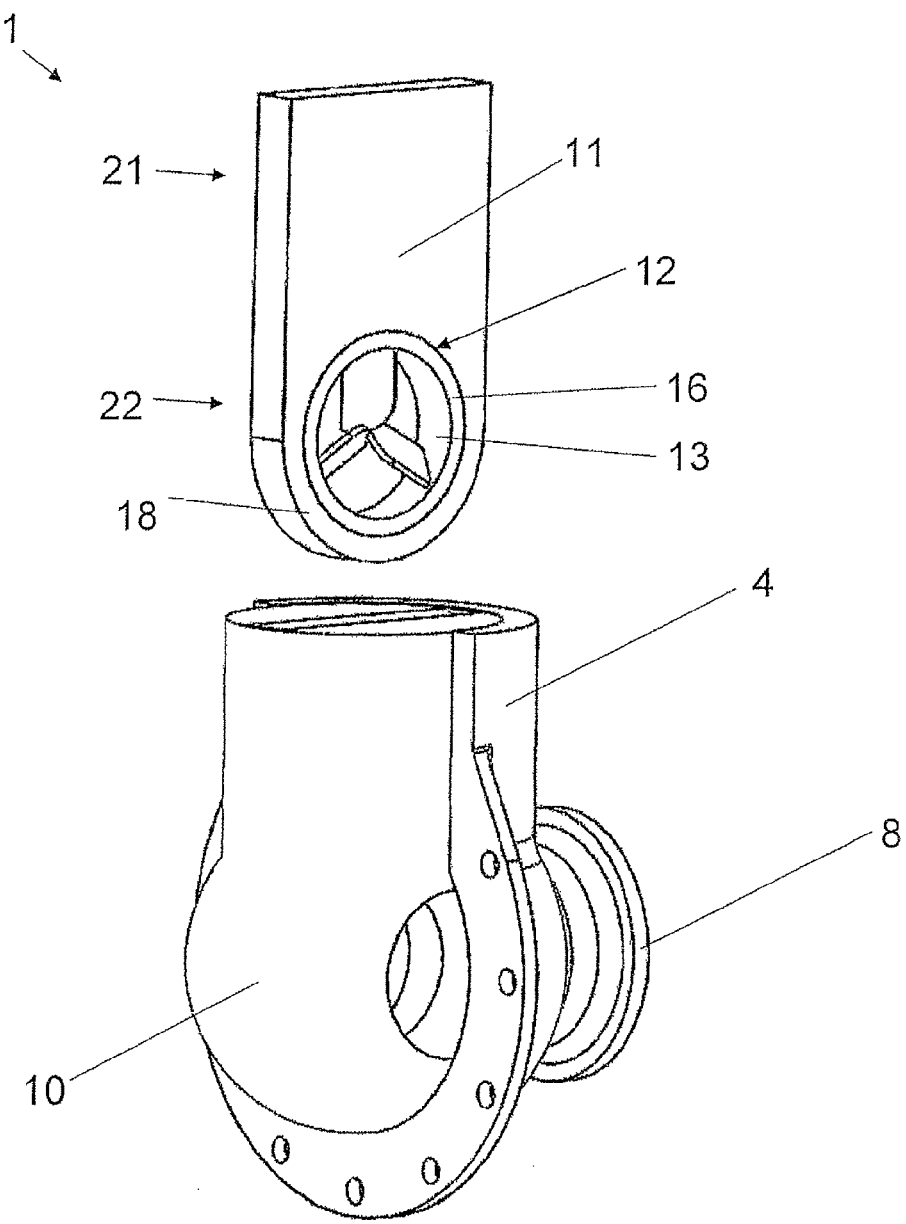
FIG. 3 shows the unit of FIG. 1 with the flow path shut off and the pump-drive module removed.

FIG. 3 now shows the same unit 1 with the flow path shut off and the pump-drive module 11 removed. The unit 1 is shown with only one casing half 4. The pump-drive module 11 is of lamellar design. It comprises an upper area 21 and a lower area 22. A pump module 12 is arranged in the lower area 22. The pump-drive module 11 comprises a hollow, annular rotor 16, hereinafter also referred to as a rotor ring, which is enclosed by a hollow, annular stator 18, hereinafter also referred to as a stator ring. A synchronous rotor excited by permanent-magnets, for example, is suitable as rotor 16. The rotor 16 is supported in the stator ring 18. The inside diameter of the rotor 16 is the same diameter as the flow passage of the shut-off device 10. The inner face 13 of the rotor ring 16 is matched in its material and design to the inner face of the passage of the ball cock. There are no impairments of any kind to the flow path when the pump-drive module 11 is inserted into the unit 1. The lower area 22 of the pump-drive module 11 is matched to the dimensions of the shut-off device 10 and has a semi-circular contour. Not show here are guide means on the pump-drive module, which serve for insertion of the latter into the shut-off device 10. For this purpose the shut-off device 10 may comprise corresponding guide mounts, likewise not shown here.

Figure 4:
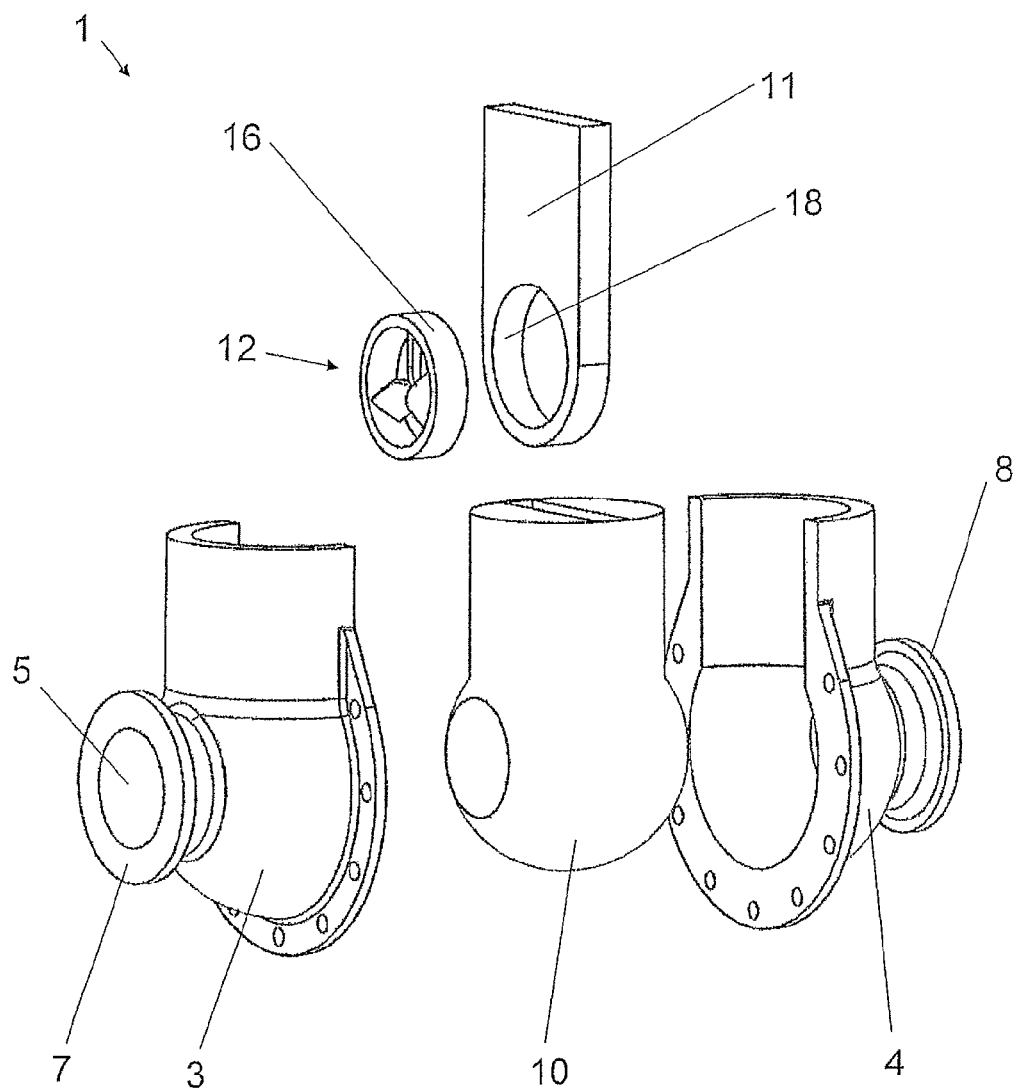
FIG. 4 shows individual components of the unit.

FIG. 4 shows the flow-ducting unit 1 with its individual components. Here the unit 1 with its shut-off device 10 in the form of a ball cock is surrounded by a multipart casing, the casing parts of which, in this instance casing halves 3, 4 with flanges 7, 8, enclose the shut-off device 10 and the pump-drive module 11. The pump module 12 can be removed, together with the annular rotor 16, from the annular stator 18.

Figure 5A:
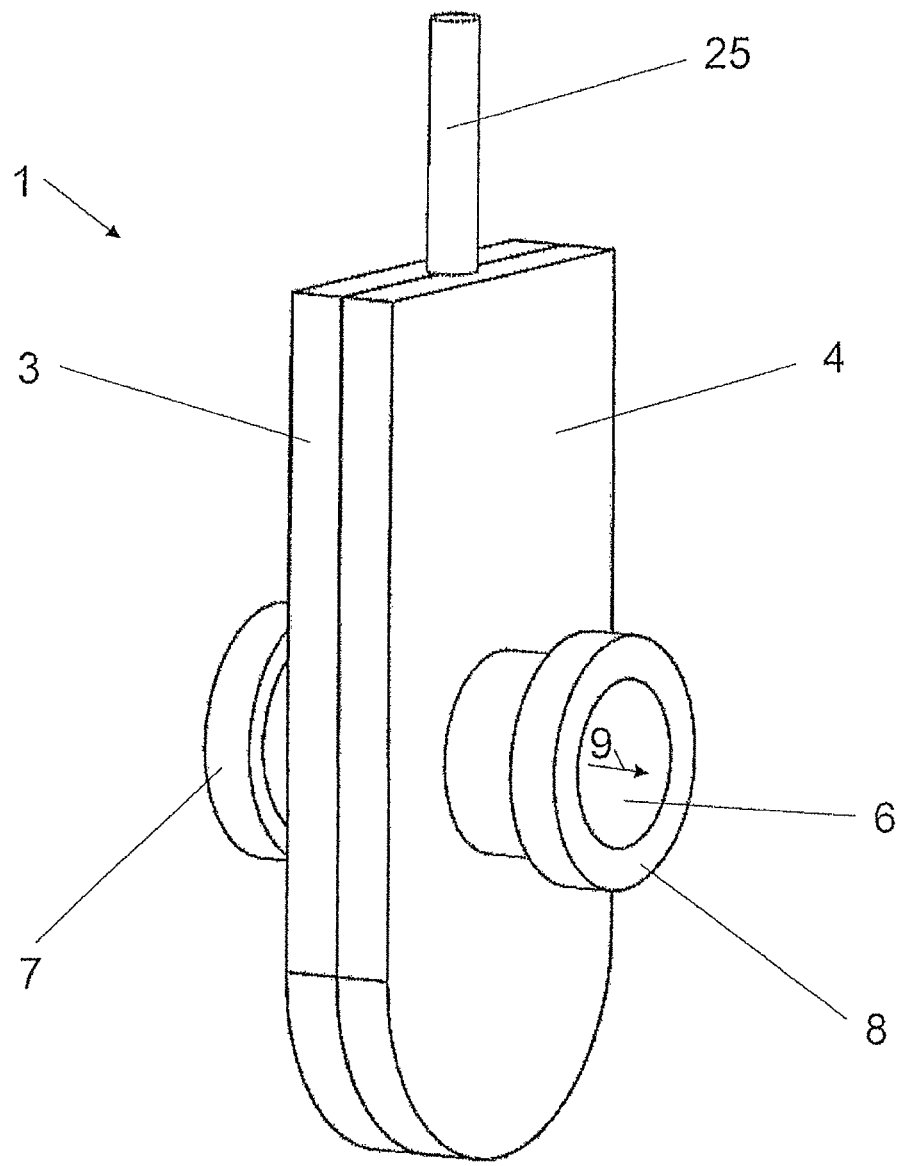
FIGS. 5a through 5d show a unit according to the invention having a shut-off device designed as a slide, with pump drive module.
Figure 5B:
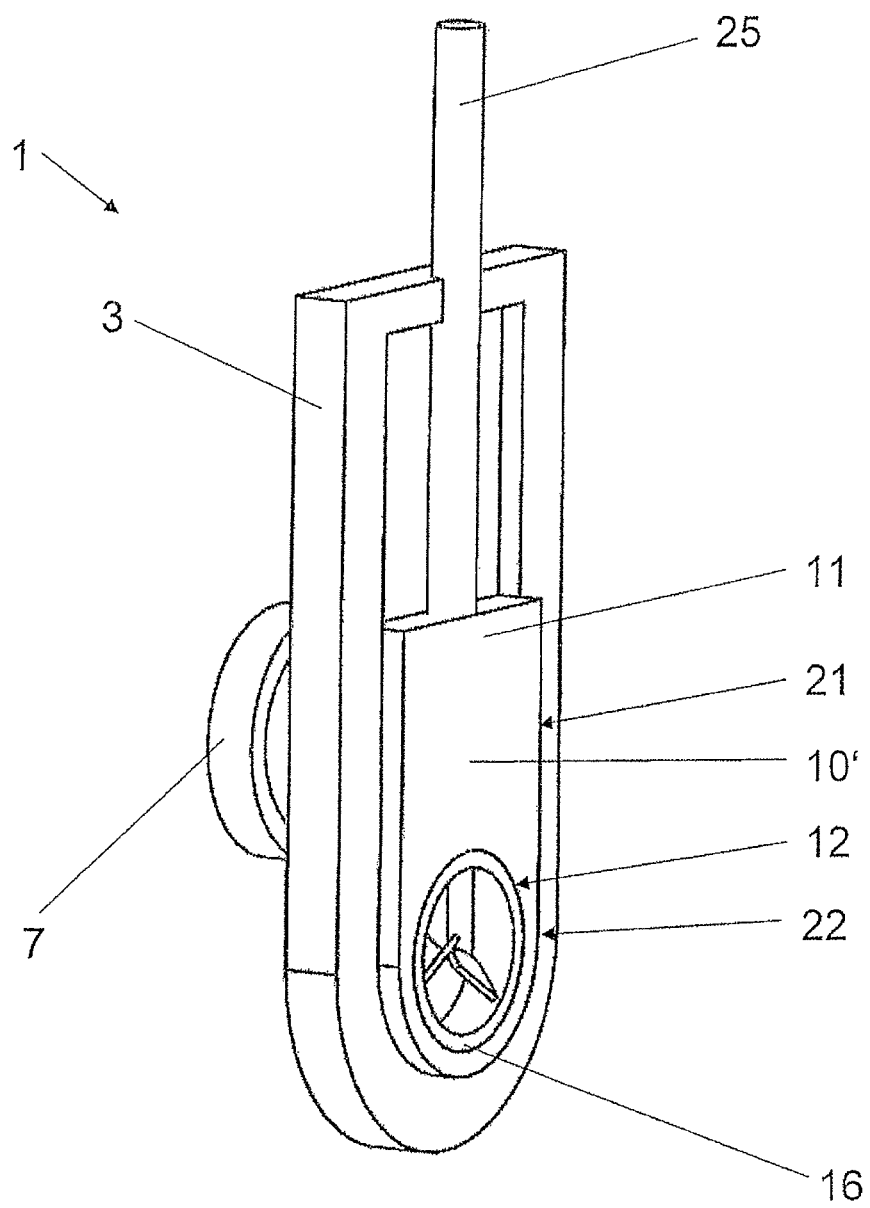
Figure 5C:
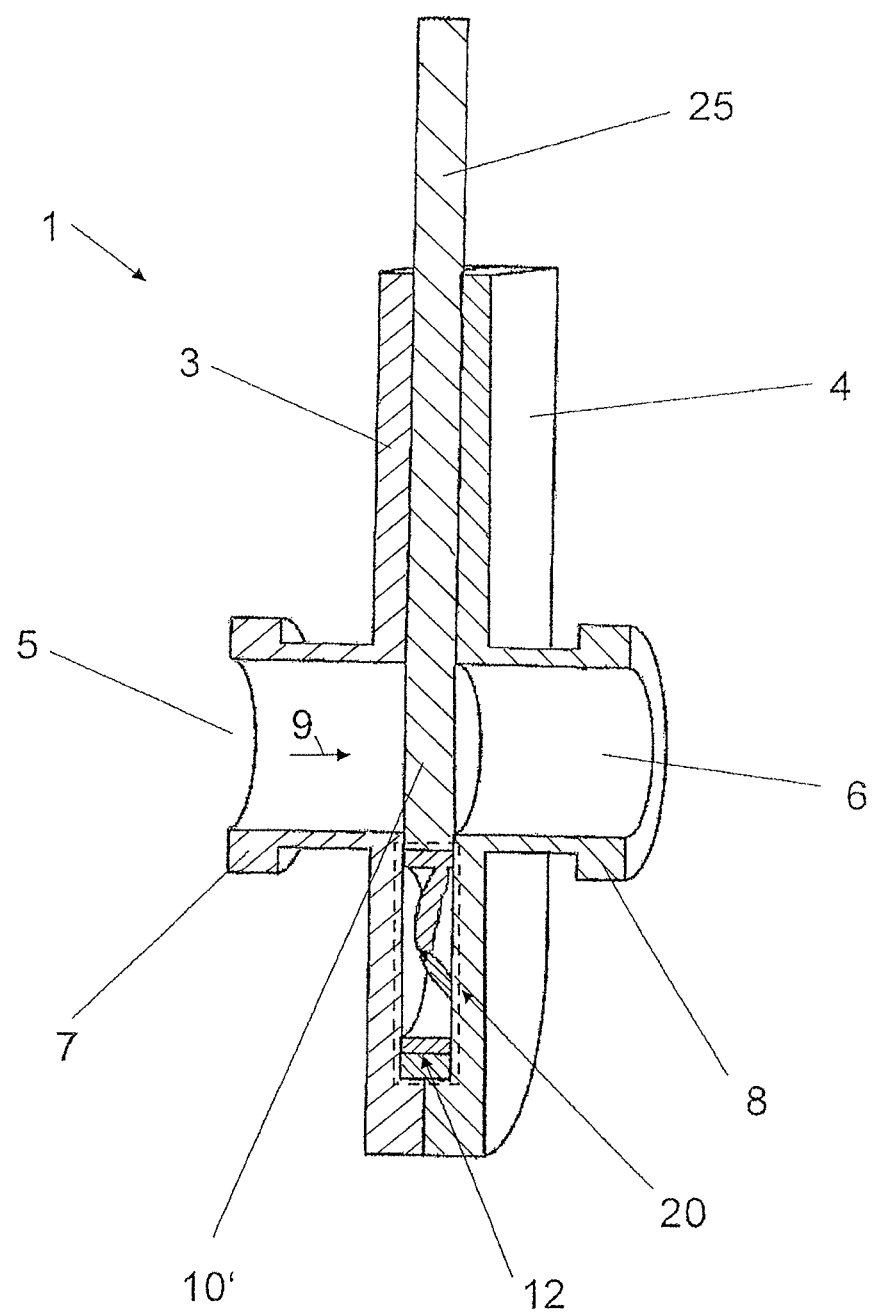
Figure 5D:
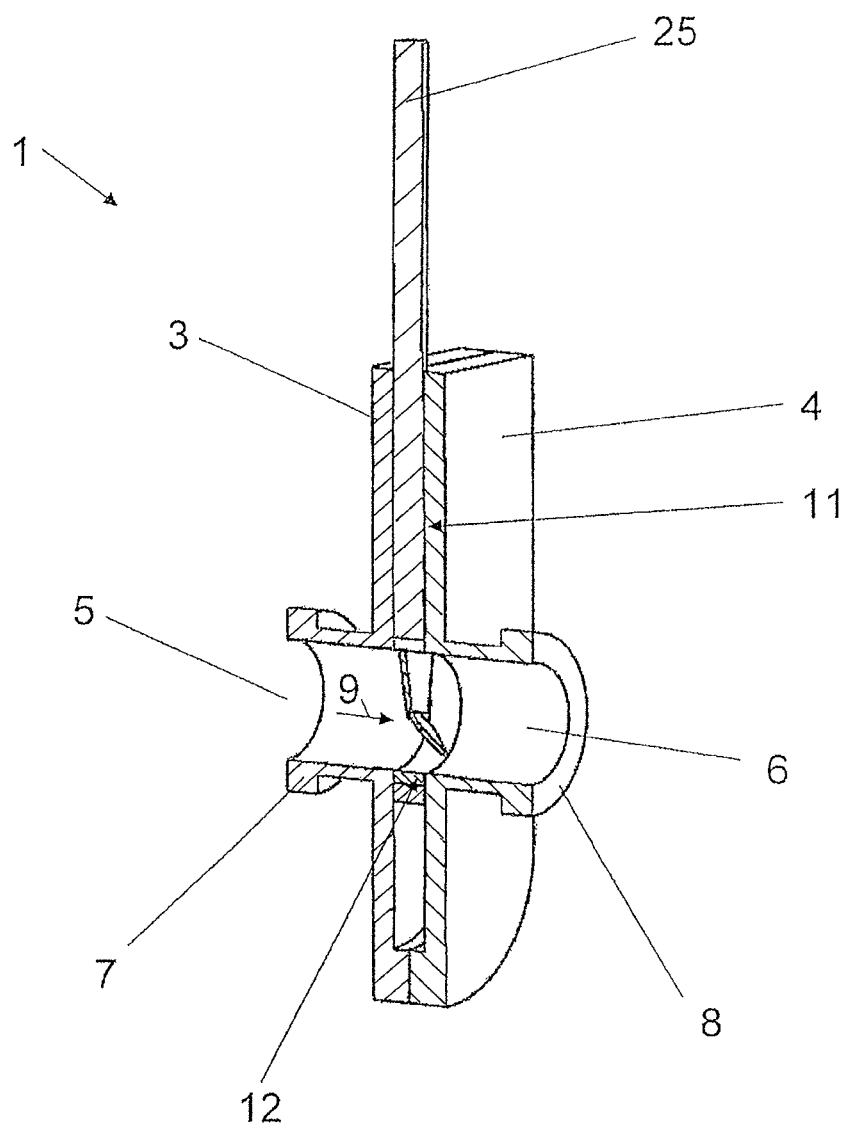

FIGS. 5a, 5b, 5c, 5d show an alternative development of a unit 1 according to the invention, in which a shut-off device 10' in the form of a slide is used. Here FIG. 5a shows a perspective view of the unit 1, FIG. 5b shows a half of the unit 1 with the flow path shut off, FIG. 5c shows a section through the unit 1 with the flow path shut off and FIG. 5d shows a section through the unit 1 with the flow path opened. As can best be seen from FIG. 5b, the slide comprises an upper area 21, which serves for shutting off the flow path by means of the shut-off device 10', and a lower area 22, which accommodates the pump module 12 including the rotor ring 16. The unit 1 has a positioning means 25, which serves for positioning the slide inside the unit 1. The upper shut-off area 21 or the pump module 12 is situated in a flow path 9, depending on how the slide is positioned inside the unit 1 according to the invention. With the flow path 9 shut off, the pump-drive module 11 with the pump module 12 including the rotor ring 16 is arranged in an area 20, drawn in by broken lines in FIG. 5c and separated from the flow path 9, and by way of an externally accessible casing chamber (not shown here) of the unit 1 is readily accessible for servicing.

Figure 6:
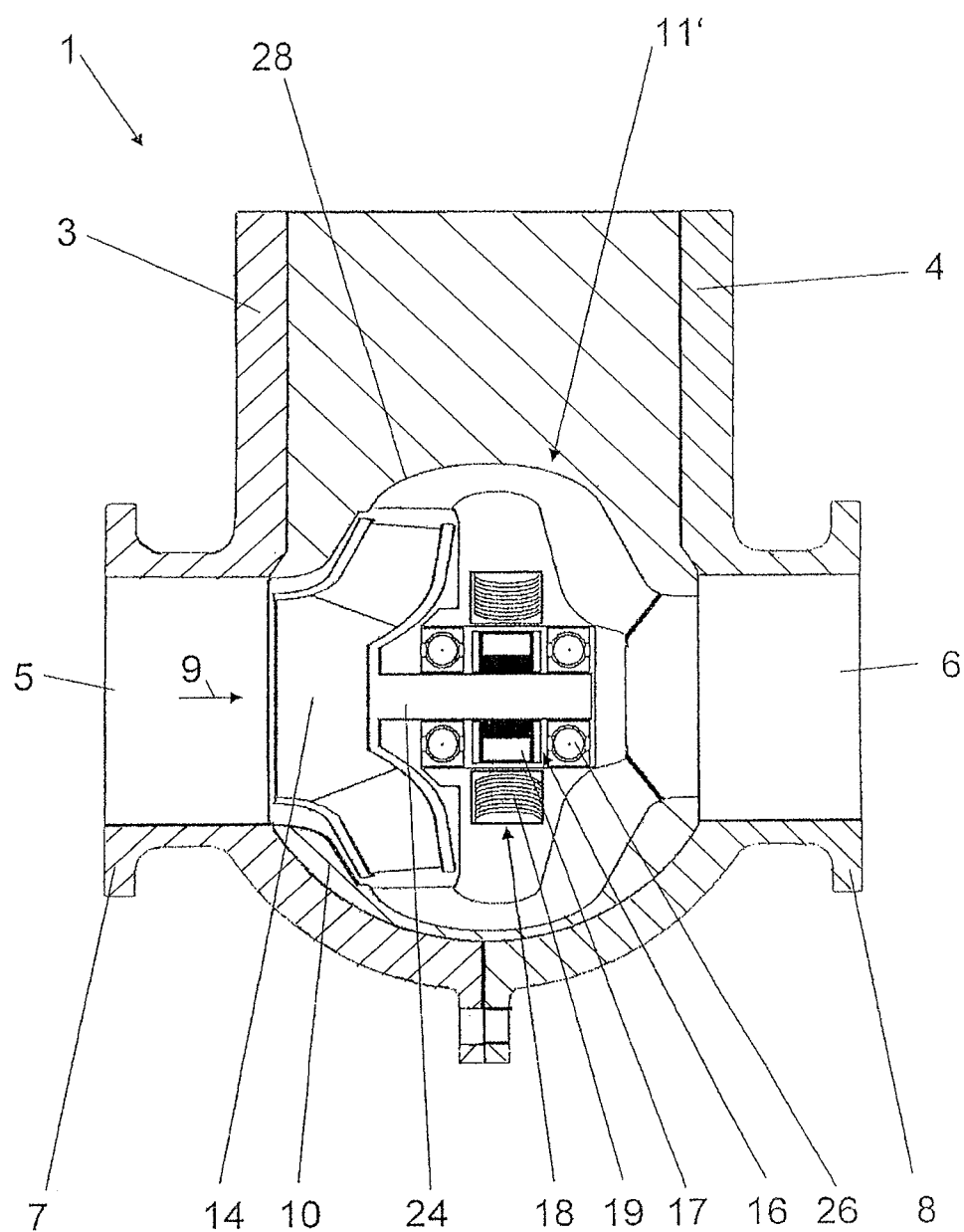
FIG. 6 shows a further unit according to the invention having a pump module equipped with a radial impeller.

FIG. 6 shows a section through a further unit 1 according to the invention, having a pump-drive module 11' equipped with a radial impeller 14. The unit 1 comprises two casing halves 3, 4 with flanges 7, 8. A flow path 9 represented by an arrow is formed between an inlet side 5 and an outlet side 6. The casing halves 3, 4 enclose a shut-off device 10 in the form of a ball cock. A pump-drive module 11' is arranged entirely inside the shut-off device 10. The pump-drive module 11' comprises a radial centrifugal pump impeller 14, which is driven by means of a shaft 24. Fastened on the shaft 24 is a rotor 16 with permanent magnets 17, which interacts with a stator 18 having a fixed stator winding 19. The shaft 24 is supported by means of a bearing 26, in this case a ball bearing, so that it can rotate in relation to the stator 18. In the opened state shown a flow path 9, which is led via the centrifugal pump impeller 14 and a baffle and/or deflecting device 28, is formed between the inlet side 5 and the outlet side 6. Through a manual or motorised rotational movement, the ball cock can be turned through approximately 90 degrees, so that the flow path 9 is shut off, in such a way that the pump-drive module 11' is arranged completely inside an area which is formed by the shut-off device 10 and the unit casing 2 and separated from the flow path 9, and which is sealed off from the inlet side 5 and the outlet side 6.

The illustrative embodiments described in FIGS. 1 to 6 each have an inlet side and an outlet side, thereby defining a flow path. Units having multiple inlet and/or outlet sides defining multiple flow paths also lie within the scope of the invention. The invention likewise provides for a unit having an additional clear passage in the shut-off device. The unit can thereby be switched between three positions. In addition to the shut-off state and the state with the pump module in the flow path, there is then a state with a completely clear passage. In this case the arrangement is designed so that with pump-drive module removed the unit can be switched between a shut-off flow passage and completely clear flow passage. Locking means in this case prevent the component being accidentally switched to a wrong position when the pump-drive module is removed.

The foregoing description and examples have been set forth merely to illustrate the invention and are not intended to be limiting. Since modifications of the described imbodiments incorporating the spirit and substance of the invention may occur to persons skilled in the art, the invention should be construed broadly to include all variations within the scope of the appended claims and equivalents thereof.

The invention claimed is:

1. A unit for a flow-ducting system with a pump-drive module, the pump-drive module comprising a drive module, and a pump module having an impeller that can be driven by said drive module, the unit comprising a casing having an inlet side and an outlet side and a moveable shut-off device arranged between them, a flow path between the inlet side and the outlet side being formed in at least one position of the shut-off device, and the pump module being arranged in the flow path between the inlet side and the outlet side, wherein the unit, in at least one further position of the shut-off device, shuts off the flow path in such a way that the shut-off device and the unit casing form an area, which is separated from the flow path and which is sealed off from the inlet side and the outlet side, and the pump-drive module including the impeller is arranged inside this sealed off area.

2. The unit according to claim 1, wherein the pump-drive module is arranged in the shut-off device.

3. The unit according to claim 1, wherein the shut-off device has a multi-part construction comprising mutually spaced shut-off device elements and the pump-drive module is arranged between the shut-off device elements.

4. The unit according to claim 1, wherein the impeller is an axial or semi-axial centrifugal pump impeller.

5. The unit according to claim 1, wherein the impeller is a radial impeller.

6. The unit according to claim 1, wherein the impeller is a shaft-less impeller.

7. The unit according to claim 1, wherein the pump-drive module comprises an impeller arranged in a rotor constructed as a ring, and a stator constructed as a ring completely enclosing the rotor.

8. The unit according to claim 7, wherein the rotor is a synchronous rotor excited by permanent-magnets.

9. The unit according to claim 7, wherein the shut-off device comprises a flow passage having a diameter which corresponds to an inside diameter of the rotor ring.

10. The unit according to claim 1, wherein the pump-drive module is removable from the unit or insertable into the unit when the flow path is shut off.

11. The unit according to claim 1, wherein the pump module or the drive module has a lamellar construction.

12. The unit according to claim 1, wherein the pump module or the drive module is matched to the dimensions of the shut-off device.

13. The unit according to claim 1, wherein the unit is constructed as a fitting.

14. The unit according to claim 13, wherein the shut-off device is constructed as a ball cock.

15. The unit according to claim 13, wherein the shut-off device is constructed as a slide.

16. The unit according to claim 1, wherein said unit comprises a multi-part casing comprising casing parts which at least partially enclose the shut-off device and the pump-drive module.

17. A method of operating the unit according to claim 1, comprising the act of:
moving the moveable shut-off device between the one position and the at least one further position to alter flow in the flow path between the inlet side and the outlet side through the pump-drive module.

* * * * *